(12) United States Patent
Gelardi, II (10) Patent No.: US 12,041,909 B2
(45) Date of Patent: Jul. 23, 2024

(54) LAUNCHER DEVICE

(71) Applicant: Anthony Gelardi, II, Arundel, ME (US)

(72) Inventor: Anthony Gelardi, II, Arundel, ME (US)

( * ) Notice: Subject to any disclaimer, the term of this patent is extended or adjusted under 35 U.S.C. 154(b) by 0 days.

(21) Appl. No.: 17/824,107

(22) Filed: May 25, 2022

(65) Prior Publication Data
US 2023/0320326 A1   Oct. 12, 2023

Related U.S. Application Data

(60) Provisional application No. 63/329,918, filed on Apr. 12, 2022.

(51) Int. Cl.
*A01K 15/02* (2006.01)
*F41B 3/04* (2006.01)

(52) U.S. Cl.
CPC .............. *A01K 15/025* (2013.01); *F41B 3/04* (2013.01)

(58) Field of Classification Search
CPC .... A01K 15/025; A01K 15/02; A01K 15/027; A63H 33/18; A63B 2208/14; A63B 65/12; A63B 59/30; A63B 47/02; A63B 47/00; A63B 59/20; A63B 2102/14; A63B 60/06; A63B 60/00; A63B 53/14; A63B 60/0085
USPC .......................... 119/707, 702; 473/460, 517
See application file for complete search history.

(56) References Cited

U.S. PATENT DOCUMENTS

| | | | |
|---|---|---|---|
| 1,022,186 A * | 4/1912 | Engler | A63B 59/20 473/509 |
| 3,428,036 A * | 2/1969 | Parker | A63B 59/20 73/862.541 |
| 4,076,004 A * | 2/1978 | Huelskamp | F41J 9/28 124/43 |
| 7,677,994 B2 | 3/2010 | Matsumoto | |
| 7,900,617 B1 | 3/2011 | Kersh | |
| D640,338 S | 6/2011 | Oblack | |
| 8,015,968 B2 | 9/2011 | Christ | |
| 8,028,684 B1 | 10/2011 | Weissmann et al. | |
| D674,851 S | 1/2013 | Osborne et al. | |
| 8,418,681 B2 | 4/2013 | Levin | |
| D782,588 S | 3/2017 | Fryer | |
| 10,004,209 B2 | 6/2018 | Hartelius | |
| 2002/0103045 A1* | 8/2002 | Lipowicz | A63B 67/205 473/505 |
| 2006/0229136 A1* | 10/2006 | Presley | A63B 60/22 473/505 |
| 2008/0004140 A1* | 1/2008 | Matsumoto | A01K 15/025 473/513 |
| 2013/0192535 A1 | 8/2013 | Smith | |
| 2015/0090237 A1 | 4/2015 | Williams | |
| 2017/0112099 A1* | 4/2017 | Hartelius | A01K 15/025 |

* cited by examiner

*Primary Examiner* — Peter M Poon
*Assistant Examiner* — Jeffrey R Larsen (57) ABSTRACT

A device for launching objects of varying shapes and sizes that include a means of being hooked and accurately launched overhand, underhand, or sideways with minimal effort and strain.

8 Claims, 11 Drawing Sheets

LAUNCHER DEVICE

BACKGROUND INFORMATION

Field of the Invention

The invention relates to devices that launch hookable objects, and in particular devices that assist a user in launching objects that appeal to pets like dogs.

Discussion of Prior Art

Throwing devices, and in particular devices that throw round shaped objects like tennis balls for pets like dogs to retrieve typically have a handle, a curved tapered flexible shaft with a cup-like head that holds the ball in place by friction. The throwing device can vary in length from 18" to 36" and requires a different throwing device for each size ball. The inside of the ball holding cup is made slightly smaller than the diameter of the ball. The user must throw the ball overhanded with enough force to overcome the frictional force between the outer diameter of the ball and the inner diameter of the cup.

These types of devices typically require practice to develop the skill of one's overhand throw using these devices to throw the ball accurately in the intended direction. Users are not able to throw the ball with an underhand throw, as the amount of force required to overcome the frictional force to release the ball from the cup is not achievable. If the ball like a tennis ball is being used, throwing with this type of device requires energy from mainly the arm and shoulder combined with a locked wrist that is necessary to dislodge the ball from the cup.

If a ball like a tennis ball is designed to fit a particular throwing device, new tennis balls fit tightly in the cup resulting in the requirement of more force to dislodge them, but when the surface of a tennis ball wears down, the fit in the cup becomes too loose and often does not hold in place prior to throwing.

Another major issue with throwers that incorporate a cup to secure and throw balls is that when the cup and/or ball becomes coated with dirt, mud, sand, grass clippings or other foreign materials, the cup can no longer pick up, hold or throw the ball. If wet or covered with pet saliva, the ball may not release from the cup due to its gooey, glue-like properties. One must clean one or both surfaces to be able to use again.

What is needed, therefore, is a one-size-fits-all launching device that is able to launch a variety of shapes and sizes of objects accurately. What is also needed is a device that is able to achieve a less stressful and effective overhand, underhand, or sideways launch repeatedly with accuracy and less effort and strain.

BRIEF SUMMARY OF THE INVENTION

The invention is a launching device that is designed to incorporate a means of hooking any size or shape of object to be launched.

The device includes a handle with a clip connected to a straight, rigid shaft that is connected to a launch head with a primary and secondary curved finger. Both the launch head and the handle end are angled with the respective angles oriented in opposing directions.

The primary curved finger and secondary curved finger of the launch head are each curved finger-like projections. The primary curved finger is the upper finger and is the longer of the two fingers, the secondary lower curved finger being shorter. Both of the primary and secondary curved fingers are curved facing inwards.

The primary curved finger length, curvature, and angle, in relation to the shaft, creates a path toward which the hooking member of the object is directed when being launched. When being launched, the shorter opposing curved finger retains the hooking member of the object to be launched from disengaging prior to launching or when being carried.

The combination of angles between the handle, shaft and launch head enables the user to effectively launch the objects with hooking members with less stress and more accuracy from an overhand, underhand, or sideways launch.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present Invention will now be described more fully in detail with reference to the accompanying drawings, in which the preferred embodiments of the Invention are shown. This Invention should not, however, be construed as limited to the embodiments set forth herein; rather, they are provided so that this disclosure will be complete and will fully convey the scope of the Invention to those skilled in the art.

FIGS. 1-11 illustrate a Launch Device 100 according to the Invention, including a first end 10, a connecting member 30, and a second end 50. The first end 10 is configured in the form of a handle 10 and is attached to the connecting member 30, a straight rigid shaft. The connecting member 30 is also attached to the second end 50, the launch head. The first end 10 and second end 50 are attached to the opposite ends of the connecting member 30.

Figure 1:
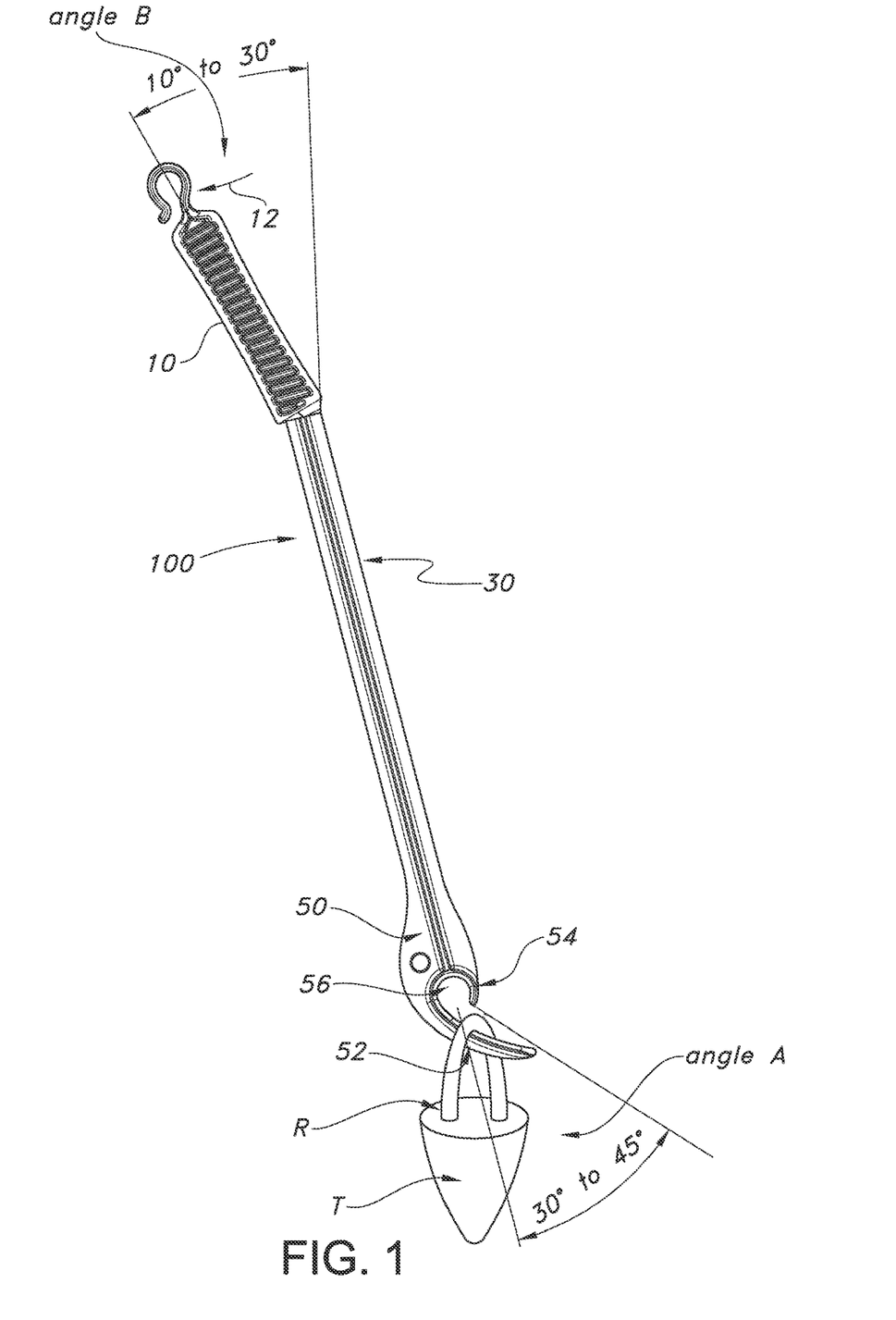
FIG. 1: Side view of the launching device according to the invention, with an object that includes a hookable means.
Figure 2:
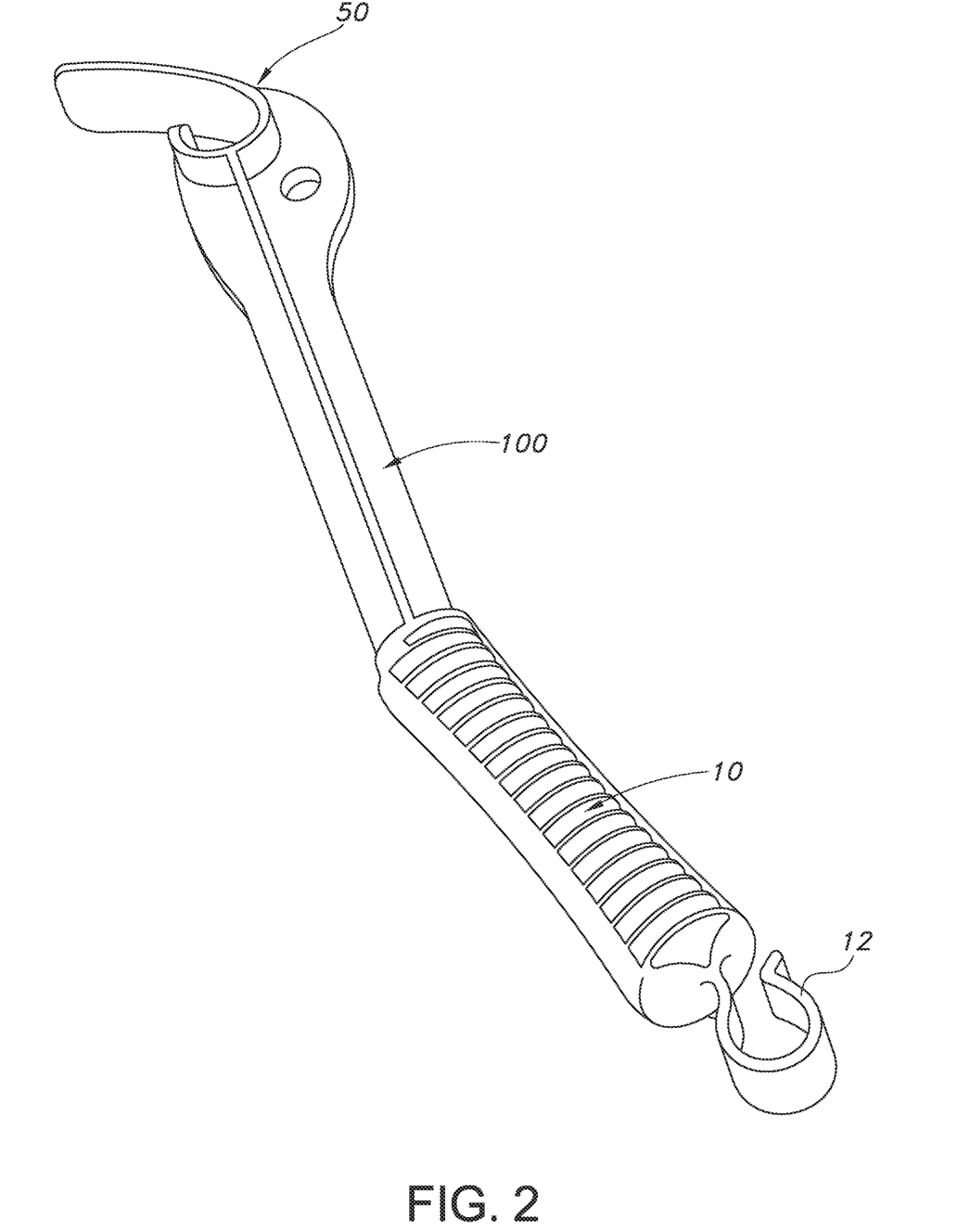
FIG. 2: Perspective view of the launching device showing angled handle with clip attached to the rigid straight shaft, and angled launch head with upper long angled launch finger, channel, and opposing shorter curved finger, both facing inwardly.
Figure 3:
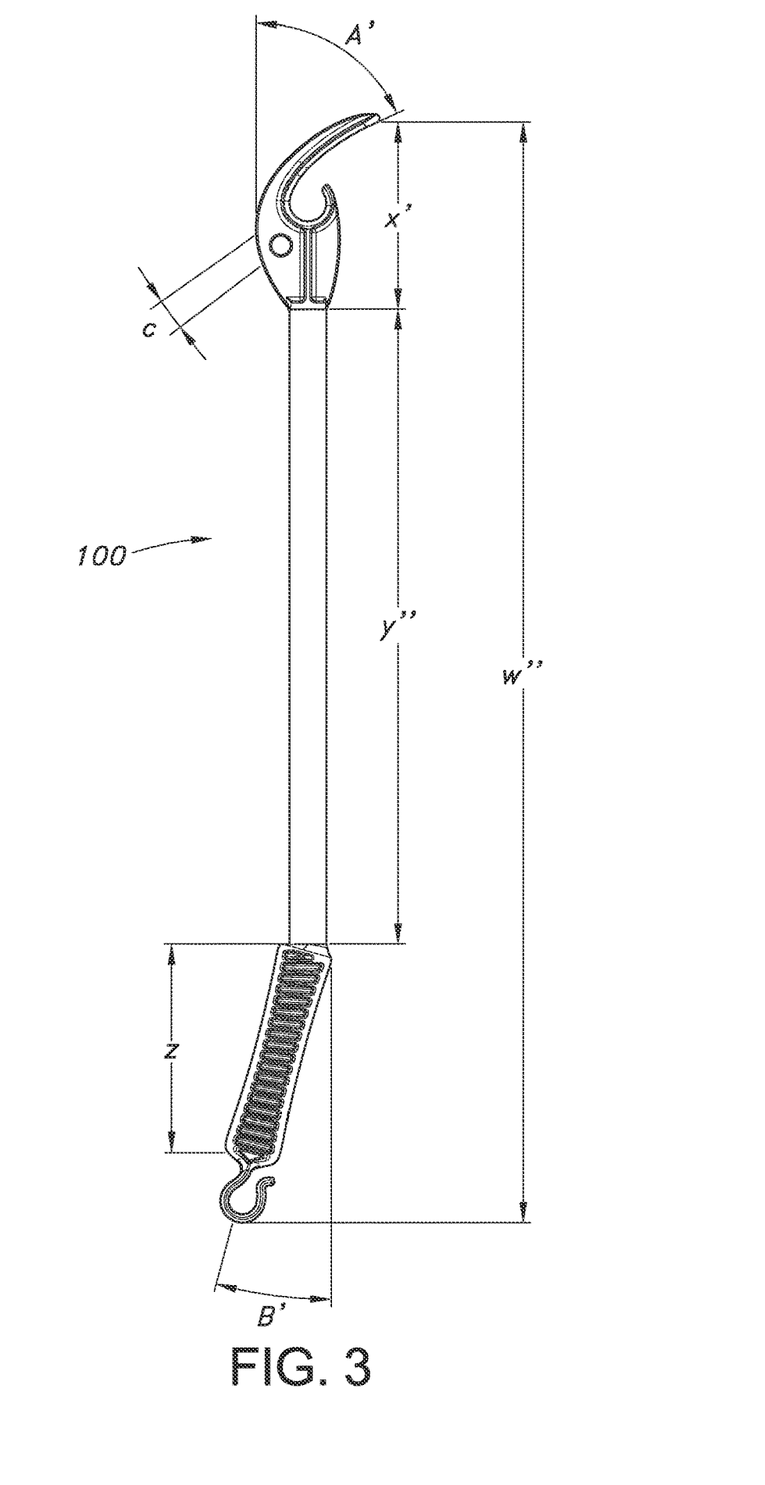
FIG. 3: Side view of the launching device that includes dimensions and angles of handle, shaft, and launch head.
Figure 4:
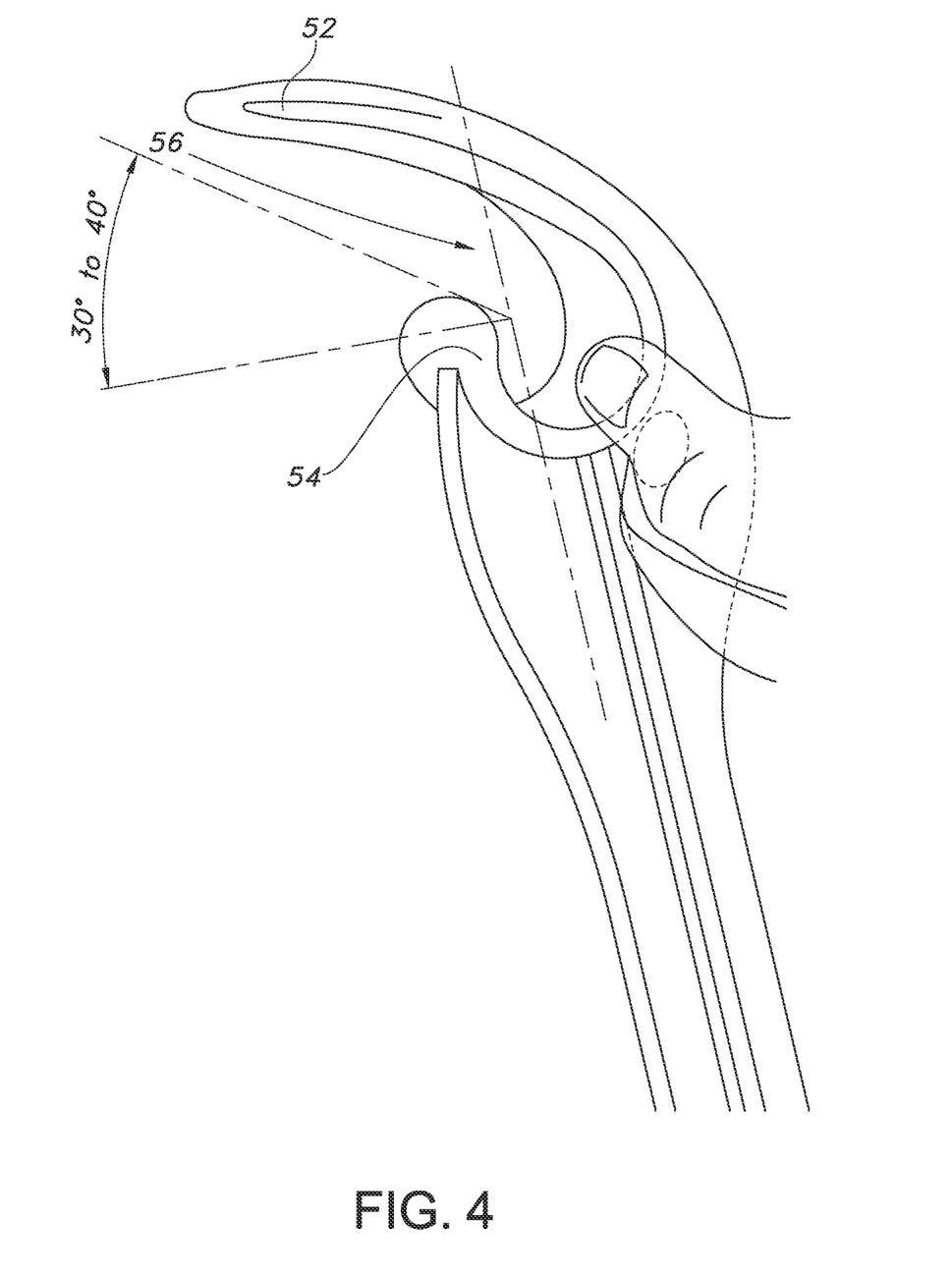
FIG. 4: Side view of launch head attached to the shaft.
Figure 5:
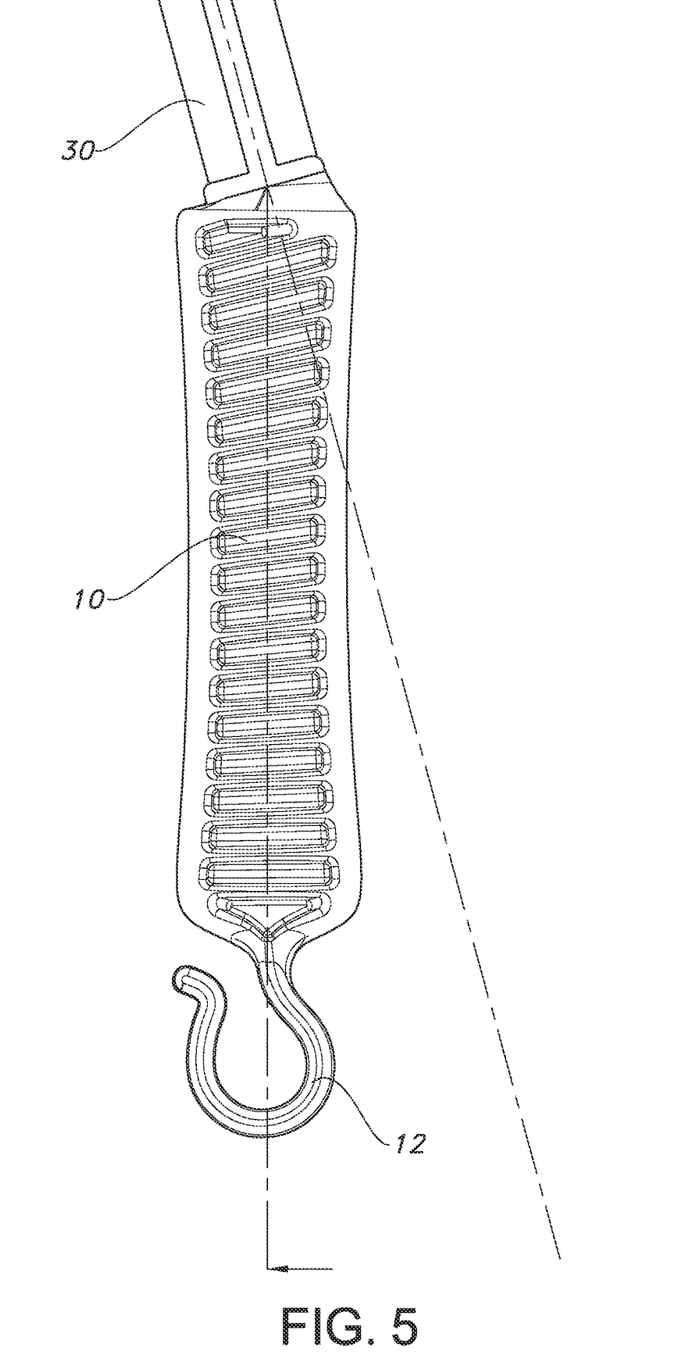
FIG. 5: Side view of the handle attached to the shaft.
Figure 6:
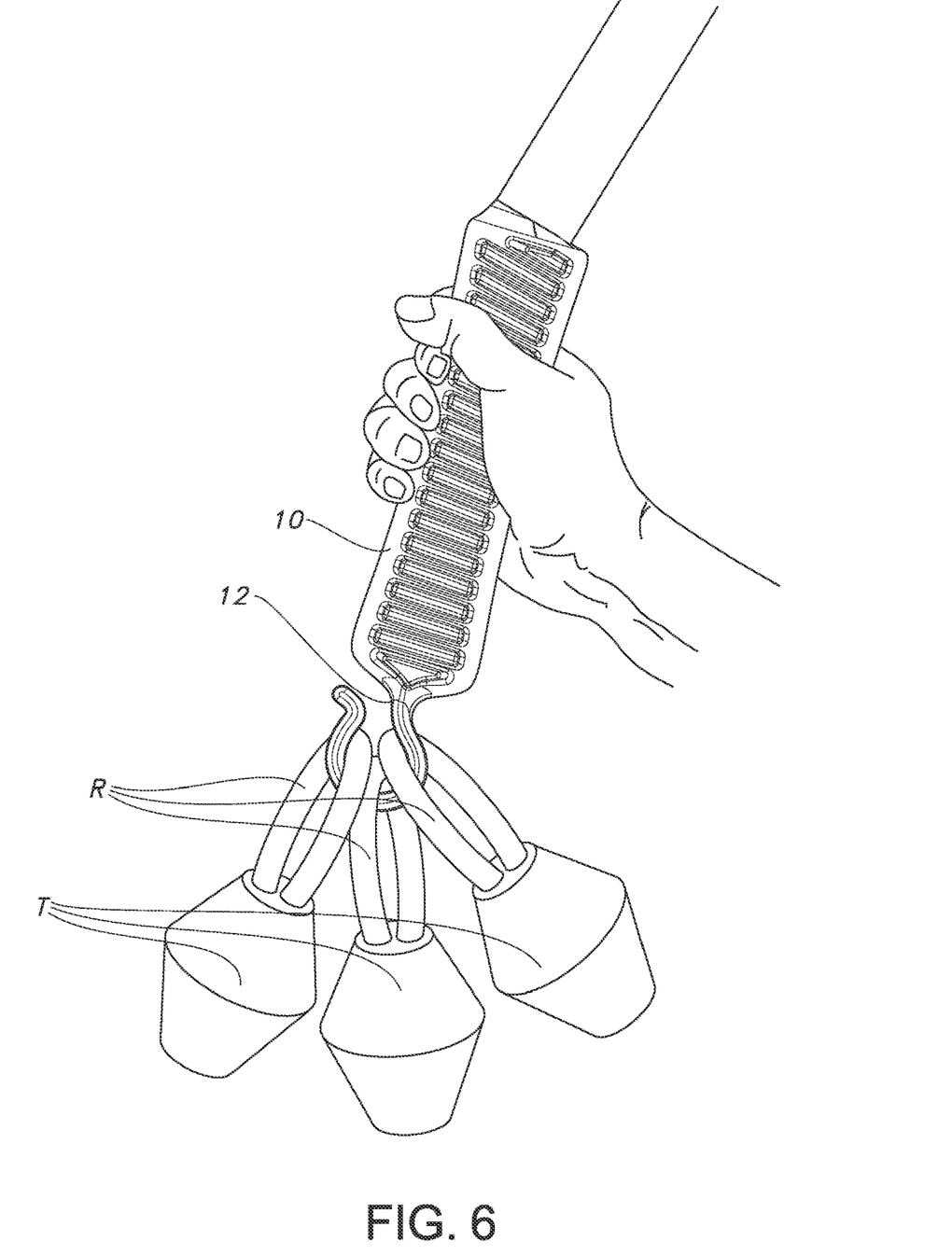
FIG. 6: Side view of the handle with a hook holding objects having hookable means.
Figure 7:
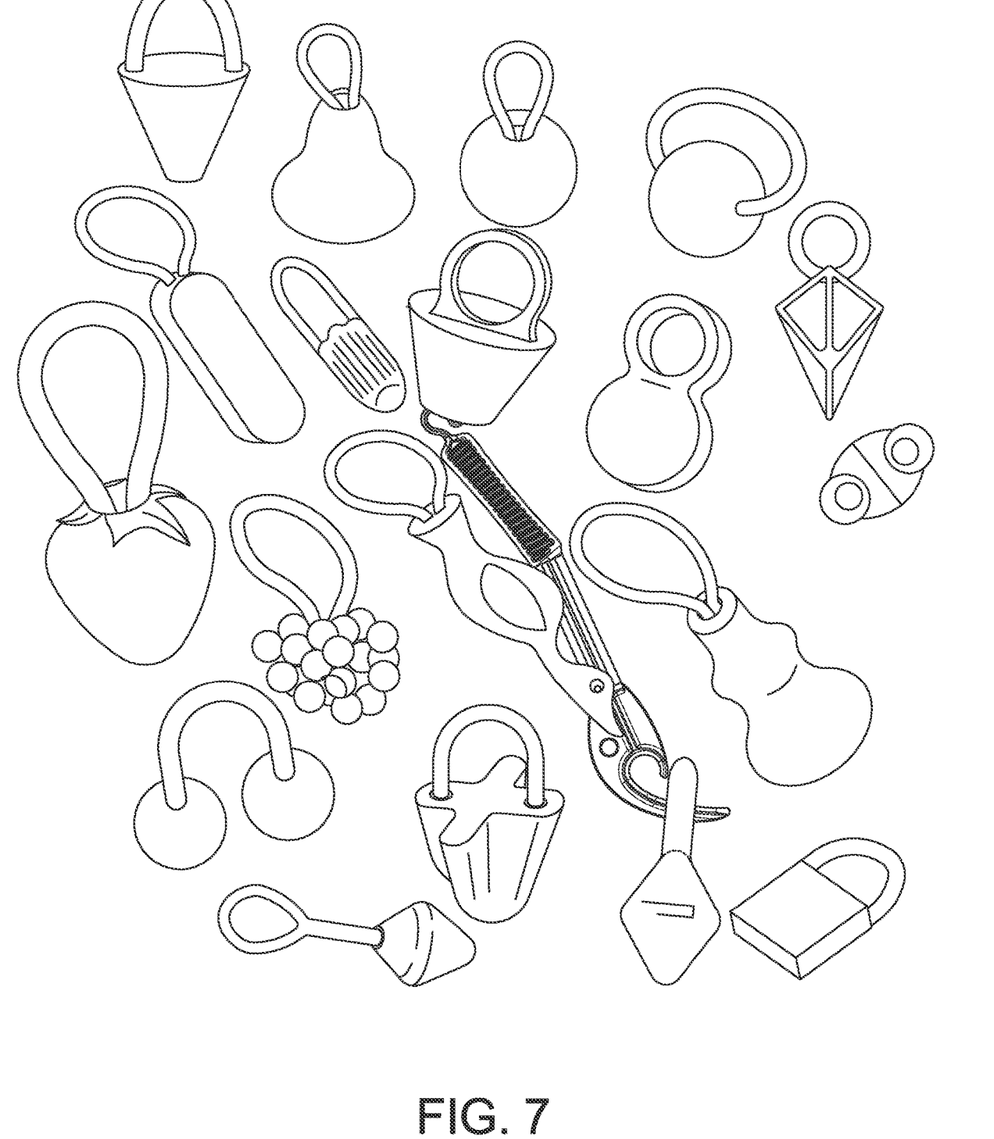
FIG. 7: Examples of hookable objects.
Figure 8:
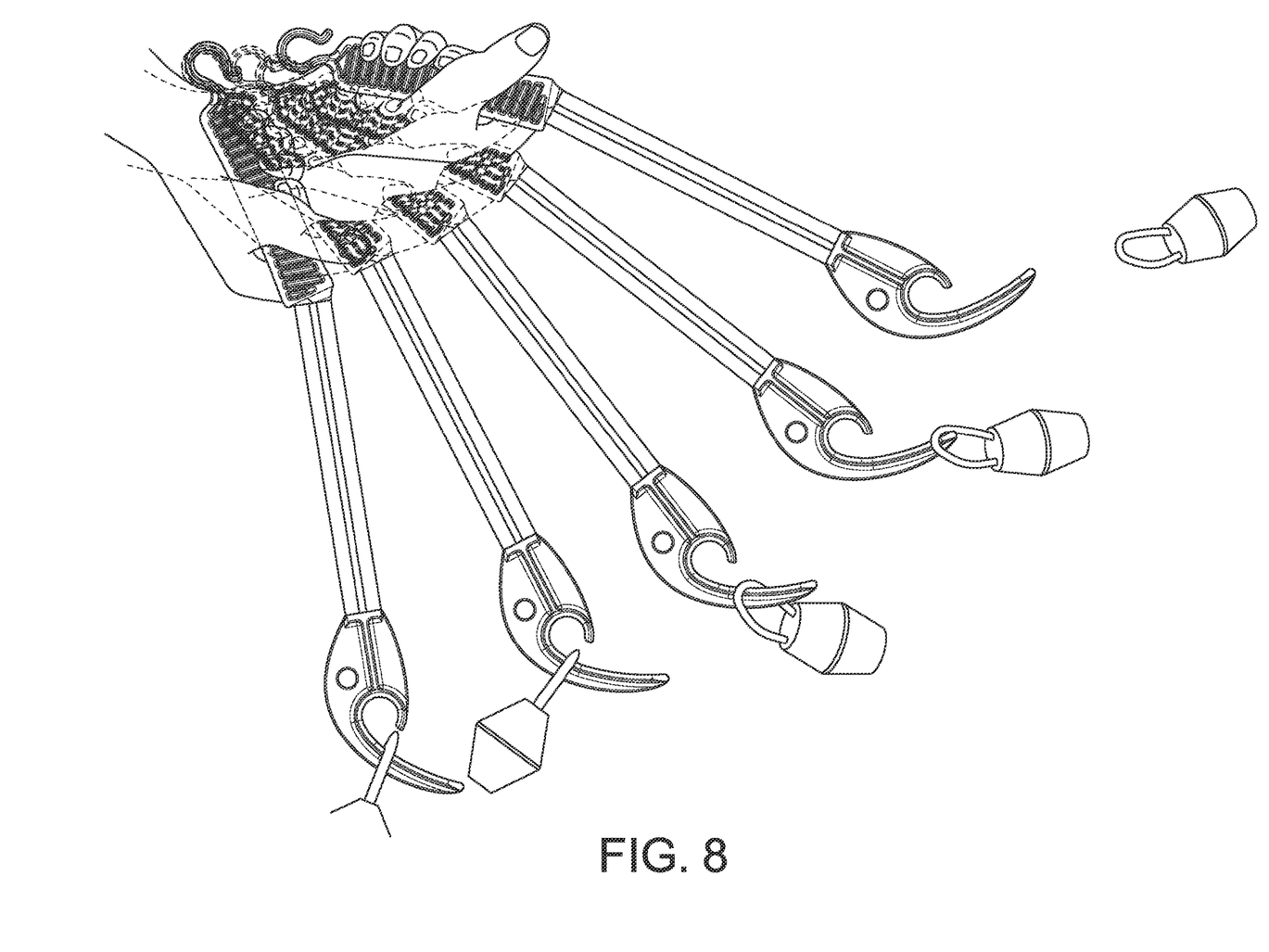
FIG. 8: Side view of the launching device in motion launching an object with an underhand motion.
Figure 9:
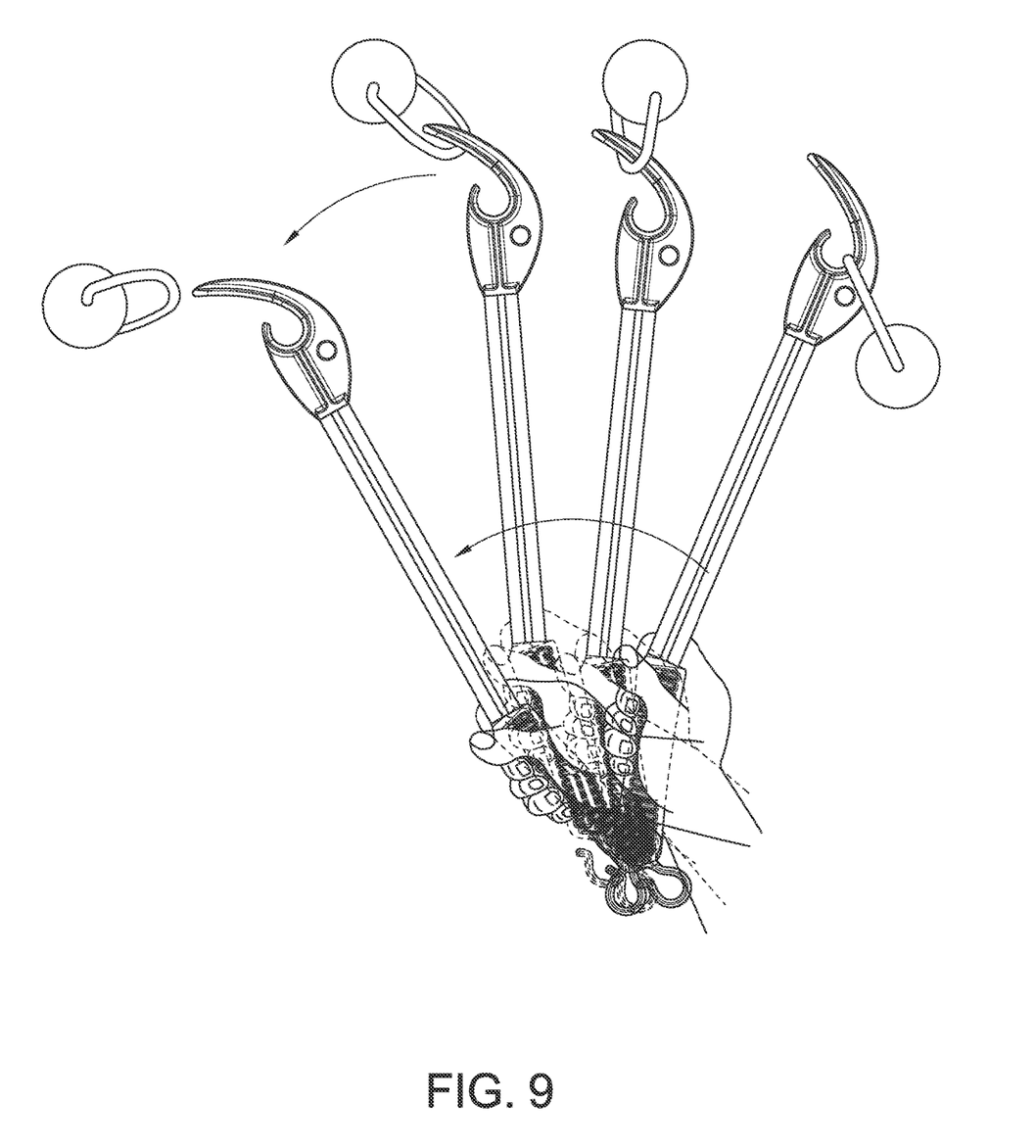
FIG. 9: Side view of the launching device in motion launching an object with an overhand motion.
Figure 10:
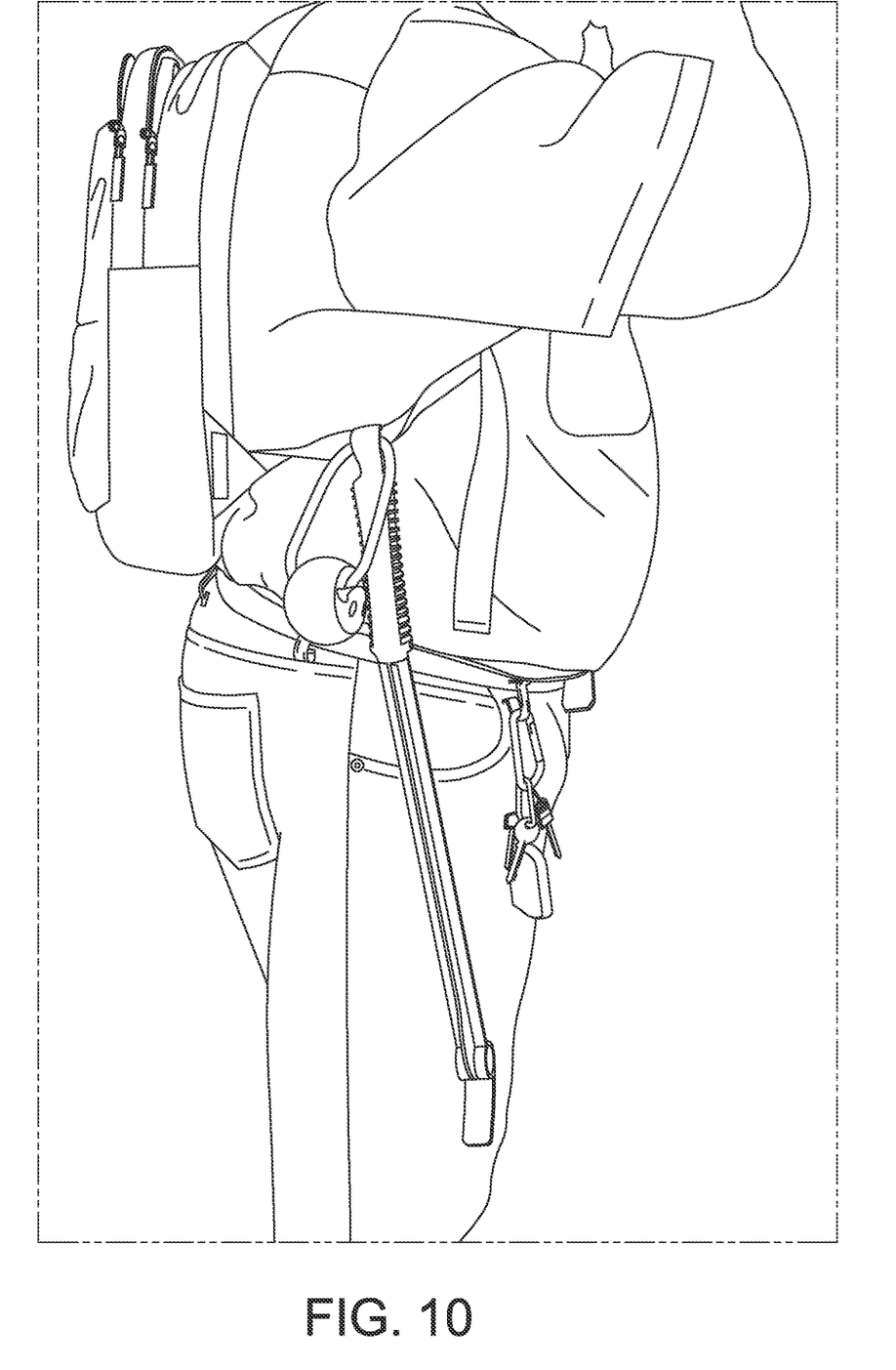
FIG. 10: Side view of a user carrying the launching device on a backpack strap.
Figure 11:
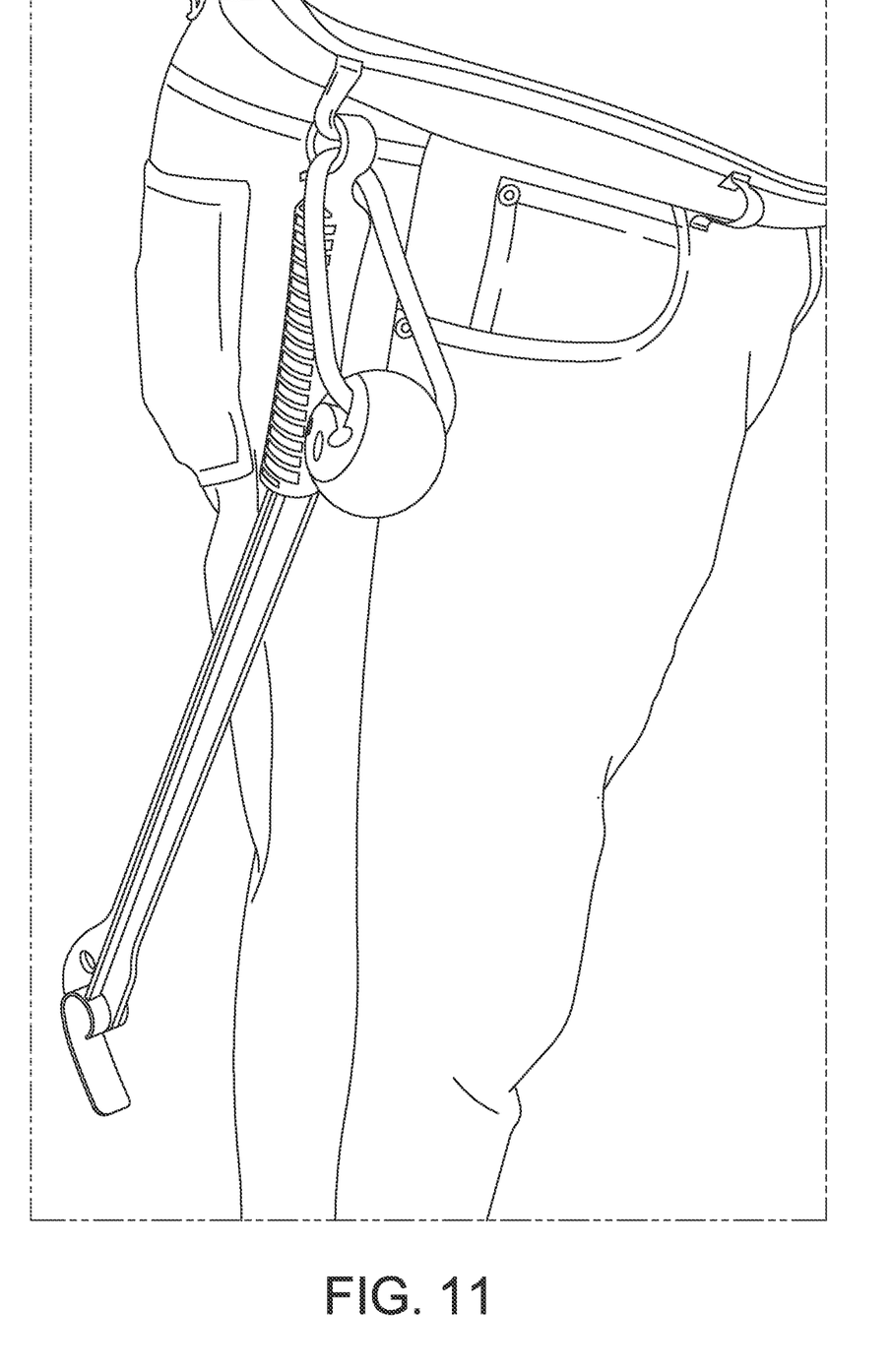
FIG. 11: Side view of a user carrying the launching device on a belt loop.

The Launch Device 100 is adapted to launch objects T having a hookeable member R. For example, the Launch Device 100 may be used to launch items such as pet toys T that are connected to a rope R, the rope R forming something of a loop that is connected to the object T. In general, the rope R is releasably secured in the launch head 50, and is launchable from a number of directions and orientations, two examples of which are illustrated in FIGS. 8 and 9. In each of the possible directions and orientations, the Launch Device 100 is configured to create an accurate throw with minimal stress on the user The launch head 50 includes a first finger 52 and a second finger 54, each of which have a curvature, the first finger 52 having a length that is significantly greater than the length of the second finger 54. The first finger 52 may also be referred to as an upper curved finger and the second finger 54 may be referred to as a lower curved finger. Both the first finger 52 and the second finger 54 curve inward towards each other creating a channel 56 between where the hookable member of each object may be retained and released from the channel 56 when launched. The length and curvature of the first finger 52 creates an exit path for the object with hookable means and provides for an excellent launch of the object out of the Launch Device 100. Meanwhile, the short length and curvature of the second finger 54 helps to retain the object in the device 100 until the user decides to launch.

The connecting member 30 is essentially a straight shaft connecting the handle member 10 to the launch end 50. In the embodiment shown it is cylindrical in shape and rigid, such that there is little to no bend in the connecting member as the user effectuates a launch. The connecting member 30 may also be comprised of a material that has some degree of flexibility and/or that has a degree of curvature.

The handle 10 is also a rigid component that is shaped and constructed to be comfortable in a user's hand. It is likely to be largely oval in shape, potentially having a grip or protrusions and indentations to accommodate a user's placement of their fingers. The handle 10 is slightly angled relative to the connecting member 30, with the angle extending in a direction that opposes the angle of the first finger 52 of the launch end. As noted above, the combination of the angle of the handle 10 and the curvature of the first finger 52 enable a user to launch an object with hookable means from a number of angles and directions, including underhand, overhand, or sideways launches. A lower end of the handle 10 also includes a clip 12 that may retain one or more objects with hookable means.

The device 100 may be made in a variety of sizes and having a variety of hand and launch head angles. For example, referring to FIGS. 3 and 4, while the exact angles may vary, it is likely the first finger 52 of the launch end has an angle of between 30 and 60 degrees relative to the connecting member 30. In the embodiment shown, the angle A is approximately 45 degrees. Similarly, the handle 10 is angled relative to the connecting member 30, likely to be between 10 degrees and 30, with the embodiment shown in the drawings having an angle of approximately 15 degrees. The handle being angled 15 to 30 degrees back from the rigid straight shaft saves the wrist from having to flex backward prior to flexing forward when the launching the object. The advantage of this is to reduce stress and fatigue of the wrist, thereby increasing playtime, and also to increase launch force and accuracy, similar to the catapult of a trebuchet.

The lengths of the various components may also vary. In the embodiment shown, for example in FIG. 3, the handle 10 has a length Z at approximately 5.25 inches, the connecting member 30 has a length Y between 12 inches and 14 inches, and the launch end 50 has a length X of approximately 4.75 inches. The overall length W of this embodiment is between 23.25 inches and 25.25 inches. Shorter sizes may also be made by reducing the length of the connecting member 30.

The device 100 may be made from a number of materials. Again, while the device 100 may have a degree of flexibility it is likely to be comprised of a rigid material, for example, a plastic such as acrylonitrile butadiene styrene, polypropylene, nylon, polycarbonate, etc. The device may also be made from wood or metal, along with a number of other suitable materials.

It is understood that the embodiments described herein are merely illustrative of the present invention. Variations in the construction of the launch device may be contemplated by one skilled in the art without limiting the intended scope of the invention herein disclosed and as defined by the following claims.

What is claimed is:

1. A device that is adapted to launch an object having a hookable member, the device comprising:
   a connector having a first end and a second end, the first end configured as a handle and the second end configured as a launch head;
   the launch head including an upper curved finger and a lower curved finger;
   each of the upper curved finger and lower curved finger having a first end and a second end, each of the first ends located near a midpoint of the second end of the connector with the first end of the upper curved finger positioned on a first side of the midpoint and first end of the lower curved finger positioned on a second side of the midpoint;
   the lower curved finger first curved outward and away from the midpoint of the second end of the connector and then curved inward, the second end of the lower curved finger pointed in a direction up and away from the first side of the midpoint and ending at a position near the midpoint;
   the upper curved finger first curved outward and away from the midpoint and then curved inward, the second end of the upper curved finger extending beyond an opposite side of the connector to a location over and above the lower curved finger, the second end of the upper curved finger extending beyond the lower curved finger in an overlapping configuration that creates a channel between the upper curved finger and lower curved finger that is approximately circular in shape, a lower portion of the channel being semi-circular with a flat surface;
   wherein the lower curved finger retains the hookable member until the object is launched and is configured to guide the hookable member along a smooth surface of the upper finger during the launch.

2. The device of claim 1, wherein the connector is a rigid shaft.

3. The device of claim 2, wherein the channel is made at a 30 degree to 45 degree angle relative to the connector.

4. The device of claim 1, the handle and launch head each being angled relative to the connector, the handle angled in a direction opposite that of the launch head.

5. The device of claim 1, wherein the handle includes a clip.

6. The device of claim 1, wherein the device is made of plastic.

7. The device of claim 1, wherein the curvature of the upper curved finger has an angle relative to the connector between 30 and 45 degrees.

8. The device of claim 1, wherein the handle has an angle relative to the connector of 15 degrees to 30 degrees.

* * * * *